United States Patent [19]

Ikeda

[11] Patent Number: 5,009,905
[45] Date of Patent: Apr. 23, 1991

[54] SUSHI FORMING METHOD

[76] Inventor: Takeo Ikeda, 1687-A Kalawi Dr., Wailuku, Hi. 96793

[21] Appl. No.: 486,290

[22] Filed: Feb. 28, 1990

[51] Int. Cl.⁵ .................................. A23L 1/00
[52] U.S. Cl. ...................... 426/297; 426/513; 426/643
[58] Field of Search .............. 426/297, 289, 392, 415, 426/513, 643; 99/450.1; 425/436 R, 110

[56] References Cited

U.S. PATENT DOCUMENTS

| | | | |
|---|---|---|---|
| 4,025,259 | 5/1977 | Howe et al. | 425/110 |
| 4,284,673 | 8/1981 | Ockels | 425/110 |
| 4,496,593 | 1/1985 | Caille | 426/289 |
| 4,778,687 | 10/1988 | Kikuchi | 426/513 |

*Primary Examiner*—George Yeung
*Attorney, Agent, or Firm*—Leon Gilden

[57] ABSTRACT

A gauge member is provided for mounting overlying a bamboo mat, wherein initially a seaweed sheet is mounted overlying the bamboo mat, the gauge is mounted overlying the seaweed sheet. Subsequently, a layer of rice is deposited within the gauge defined by a framework and filled within the gauge up to a predetermined marking. A layer of seafood is then deposited overlying the rice, whereupon the gauge is removed. Finally, the bamboo sheet is rolled and arced to enable rolling of the seaweed sheet containing the rice and seafood therewithin.

2 Claims, 4 Drawing Sheets

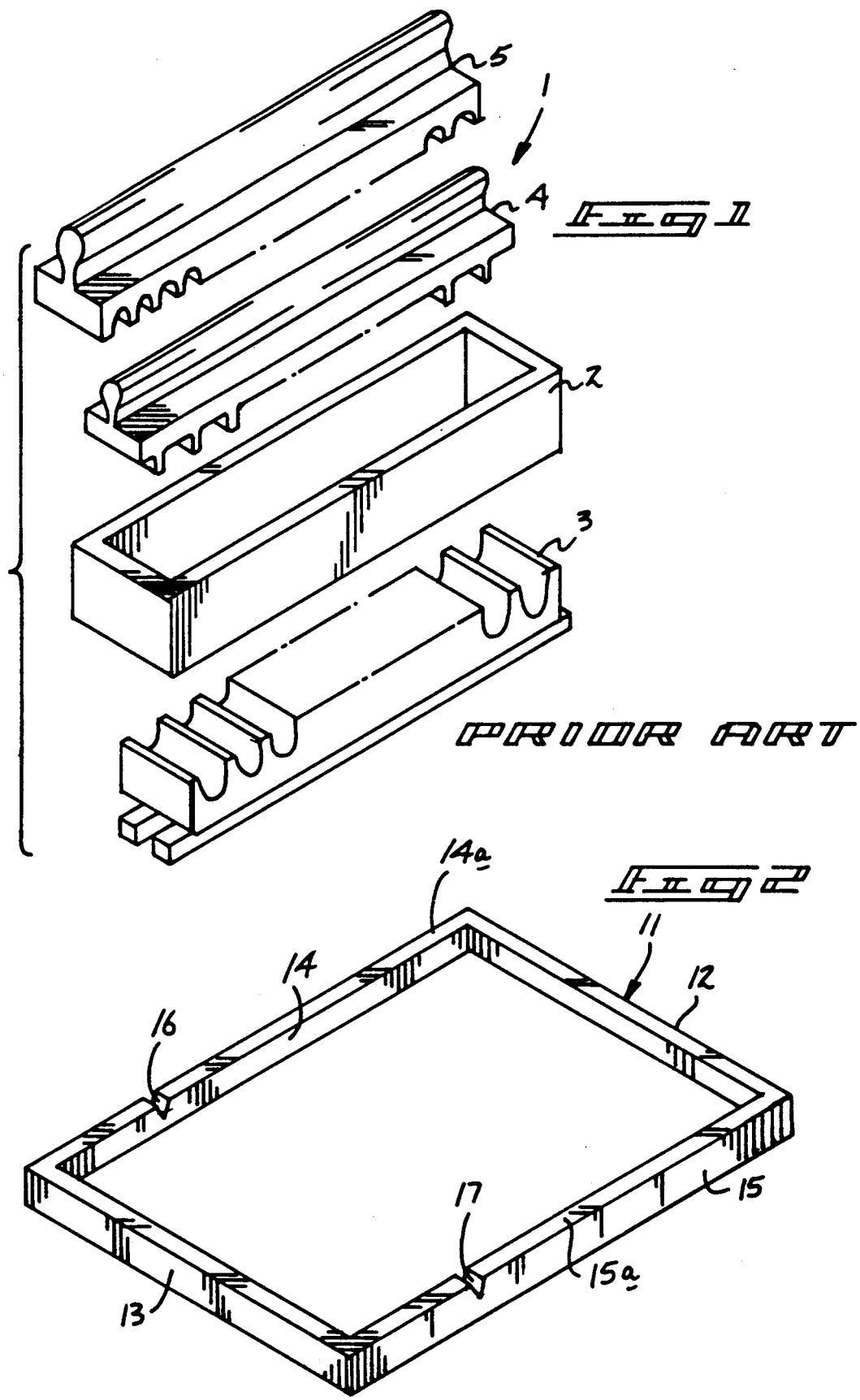

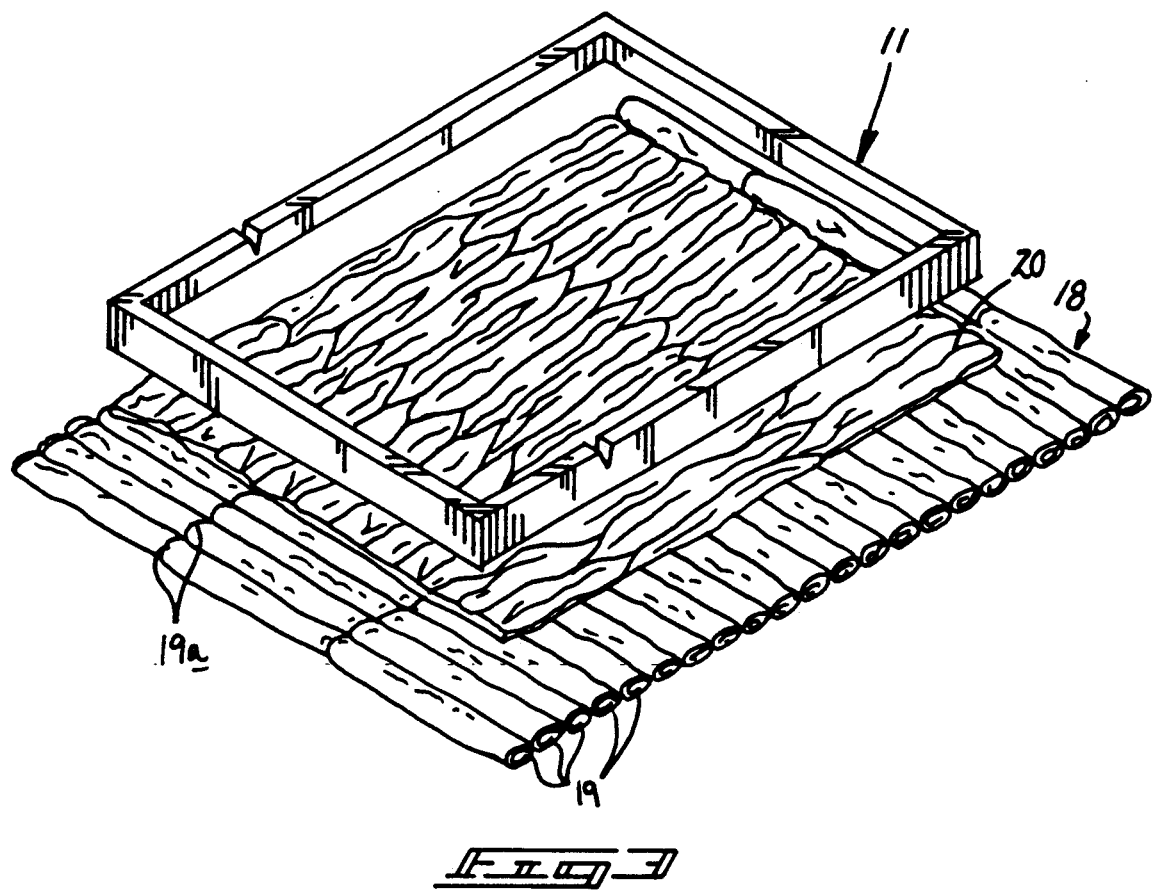
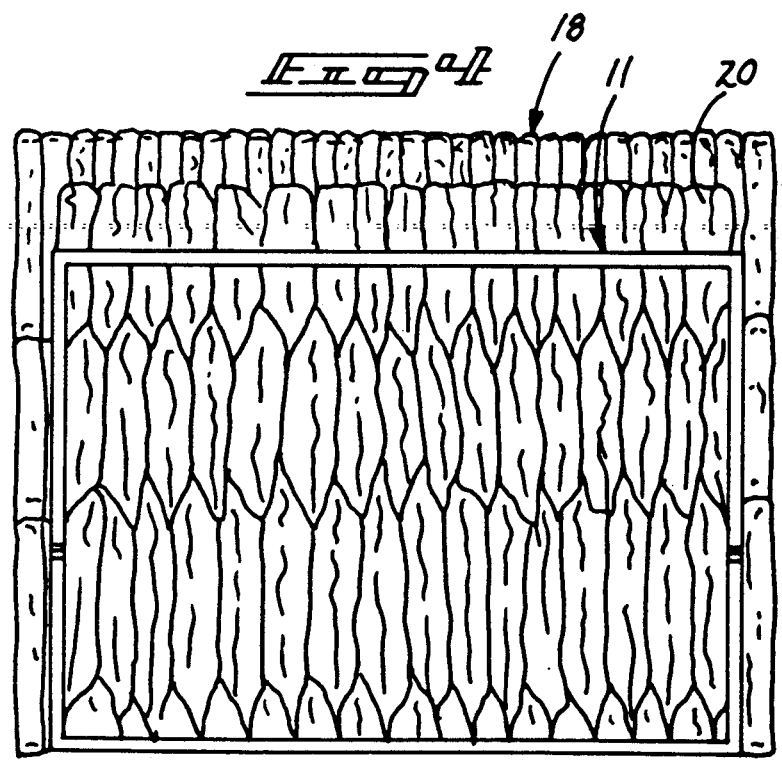

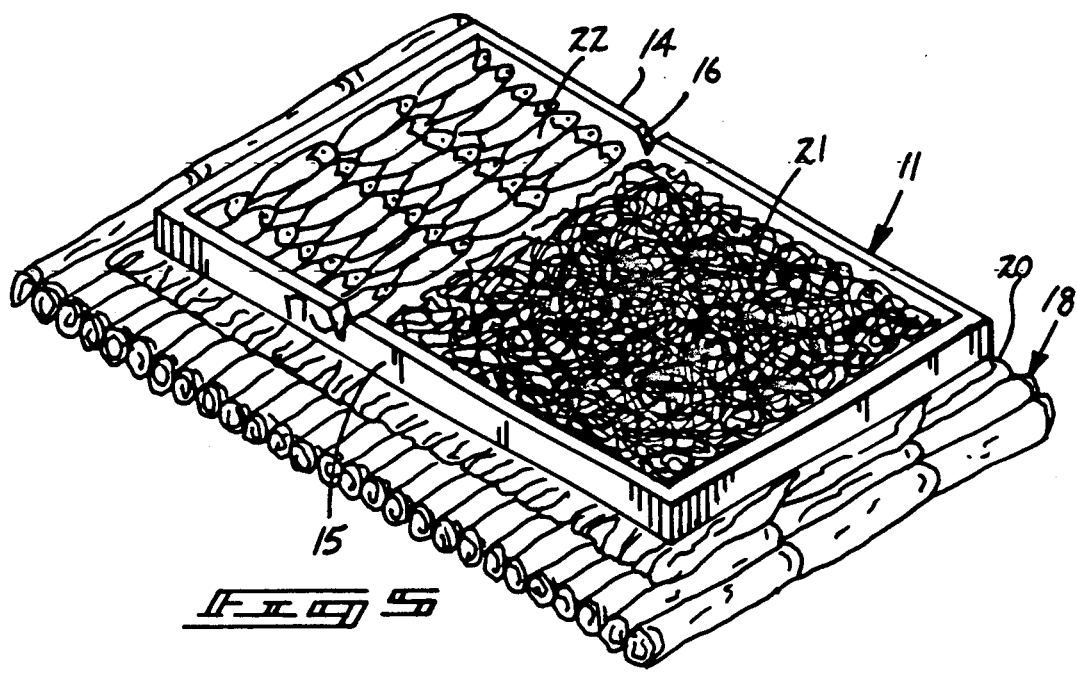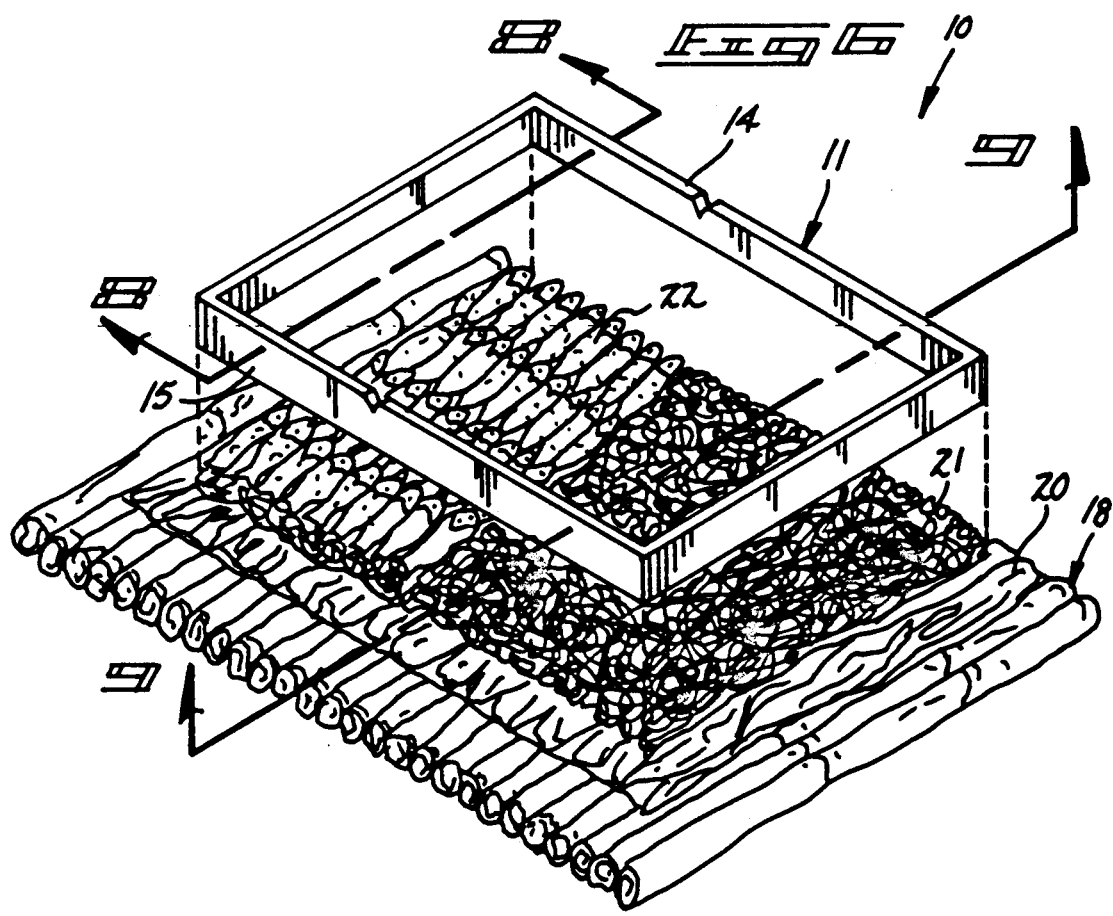

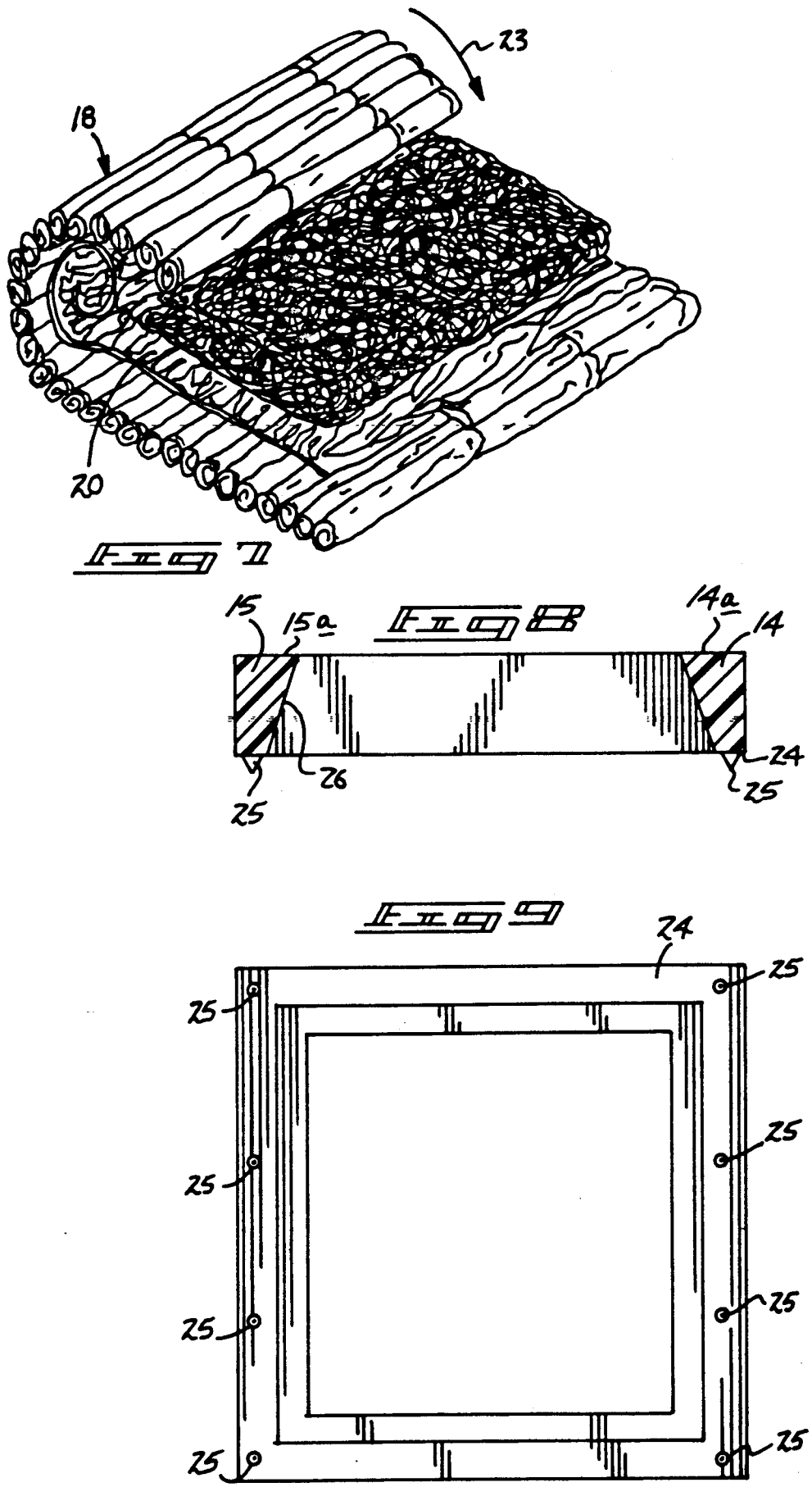

SUSHI FORMING METHOD

BACKGROUND OF THE INVENTION

1. Field of the Invention

The field of invention relates to sushi forming methods and apparatus, and more particularly pertains to a new and improved sushi forming gauge wherein the same is ultilized in a method of forming rolls of sushi.

2. Description of the Prior Art

In the making of rolls of sushi defined by a seaweed sheet containing rice and seafood therewithin, the prior art has generally relied upon random depositing of various components of the sushi roll in the creation and forming of a final product. The instant invention provides a gauge structure in association with the making of sushi to enable a consistent and predictable product to be created. Examples of the prior art include U.S. Pat. No. 4,437,826 to Tezuka ultilizing a central framework with an underlying ribbed die and an overlying die to compact various rice and components within respective rolls.

U.S. Pat. No. 4,556,379 to Ikishima provides a sushi shaping apparatus with opposed conveyor belts to direct sushi into predetermined configurations.

U.S. Pat. No. 3,838,955 to Dubbeld provides a cheddar cheese type mold with an upper plate receivable within a bottom cup-shaped mold.

U.S. Pat. No. 4,674,967 Oseka provides a support tray member to supportingly receive layers of food, such as in a sushi roll, for ultimate forming of the rolled sushi.

U.S. Pat. No. 2,554,734 to Gehm sets forth a press arrangement wherein a stamping member includes a fabric securable therearound for pressing of cookie dough into a predetermined shape.

As such, it may be appreciated that there continues to be a need for a new and improved sushi forming gauge wherein the same addresses both the problems of ease of use, as well as effectiveness in construction and in this respect, the present invention substantially fulfills this need.

SUMMARY OF THE INVENTION

In view of the foregoing disadvantages inherent in the known types of sushi forming apparatus now present in the prior art, the present invention provides a sushi forming gauge wherein the same provides a perimeter for receiving and securing predetermined quantities of layered food utilized in forming of sushi. As such, the general purpose of the present invention, which will be described subsequently in greater detail, is to provide a new and improved sushi forming gauge which has all the advantages of the prior art sushi forming apparatus and none of the disadvantages.

To attain this, the present invention provides a gauge member for mounting overlying a bamboo mat, wherein initially a seaweed sheet is mounted overlying the bamboo mat, the gauge is mounted overlying the seaweed sheet. Subsequently, a layer of rice is deposited within the gauge defined by framework and filled within the gauge up to a predetermined marking. A layer of seafood is then deposited overlying the rice, whereupon the gauge is removed. Finally, the bamboo sheet is rolled and arced to enable rolling of the seaweed sheet containing rice and seafood therewithin.

My invention resides not in any one of these features per se, but rather in the particular conbination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be ultilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sushi forming gauge which has all the advantages of the prior art sushi forming apparatus and none of the disadvantages.

It is another object of the present invention to provide a new and improved sushi forming gauge which may be easily and efficiently manufactured and marketed.

It is a further object of the present invention to provide a new and improved sushi forming gauge which is of a durable and reliable construction.

An even further object of the present invention is to provide a new and improved sushi forming gauge which is susceptible of a low cost of manufacture with regard to both materials and labor, and which accordingly is then susceptible of low prices of sale to the consuming public, thereby making such sushi forming gauges economically available to the buying public.

Still yet another of the present invention is to provide a new and improved sushi forming gauge which provides in the apparatuses and methods of the prior art some of the advantages thereof, while simultaneously overcoming some of the disadvantages normally associated therewith.

Still another object of the present invention is to provide a new and improved sushi forming gauge wherein the same enables repetitive predictability in creation of rolls of sushi.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art sushi forming apparatus.

FIG. 2 is an isometric illustration of the sushi forming gauge framework utilized by the instant invention.

FIG. 3 is an isometric illustration of the framework gauge of the instant invention utilized in an overlying relationship to an underlying bamboo mat capturing a seaweed sheet therebetween.

FIG. 4 is a top orthographic view of the invention as illustrated in FIG. 3.

FIG. 5 is an isometric illustration of the instant invention mounting a layer of rice and seafood within the gauge framework.

FIG. 6 is an isometric illustration of the gauge framework and its subsequent removal from the layered seaweed sheet, rice layer, and seafood layer.

FIG. 7 is an isometric illustration of the bamboo mat utilized by the instant invention and its initial rolling of the sushi product.

FIG. 8 is an orthographic cross-sectional view taken along the lines of 8-8 of FIG. 6 in the direction indicated by the arrows.

FIG. 9 is an orthographic view taken along the lines 9—9 of FIG. 6 in the direction indicated by the arrows.

DESCRIPTION OF THE PREFERRED EMBODOMENT

With reference now to the drawings, and in particular to FIGS. 1 to 9 thereof, a new and improved sushi forming gauge embodying the principles and concepts of the present invention and generally designated by the reference numeral 10 will be described.

FIG. 1 is illustrative of a prior art sushi forming apparatus 1 wherein a rectangular framework 2 defined by planar walls receives an underlying mold 3 defined by "U" shaped recesses formed transversely thereof. An upper plate member 4 initially compacts the sushi components between the recesses of the member 3, with the upper mold 5 subsequently positioned within the framework 2 to create final rolls of a sushi product.

More specifically, the sushi forming gauge 10 of the instant invention essentially comprises a rectangular frame 11 defined by a smooth interior wall surface to avoid adherence of food particles thereto and enhancing ease of subsequent cleaning of the framework. The frame 11 may be formed of any suitable rigid polymeric material, as well as stainless steel and the like. The rectangular frame 11 includes a first end wall 12 spaced from and parallel to a second end wall 13, with a first side wall 14 and a second side wall 15 orthogonally mounted between the first and second end walls. Each of the end walls and the side walls are of an equal predetermined height, and wherein the side walls each include a respective first top surface 14a and a second top surface 15a. It should be understood that the top surface of the entire frame member 11, as well as the bottom surface, are continuous and in the same plane to define a through-extending retangular opening through the framework. Mounted through a respective top surface 14a and 15a of the first and second side walls 14 and 15 are a respective first "V" shaped gauge notch 16 and a second "V" shaped gauge notch 17 mounted through the top surface of each of the respective first and second side walls spaced adjacent the second end wall 13 to enhance visual observation of the "V" shaped notches. The "V" shaped notches are directed downwardly through the top surfaces of the side walls a distance substantially equal to one-fourth to one-half the height of each of the side walls.

FIG. 3 illustrates the rectangular frame 11 mounted overlying a bamboo mat 18, with a flexible seaweed sheet 20 mounted in a sandwiched relationship therebetween. The seaweed sheet 20 is of a flexible commercially available construction formed of natural seaweed and is defined by a surface area less than that defined by the bamboo mat 18 to be received wholly within the upper surface of the bamboo mat. The bamboo mat 18 is formed of a series of parallel bamboo rods 19 parallel and hingedly mounted together by interlacing of flexible fibers 19a between the rods. Subsequent to the positioning of the rectangular frame 11 onto the seaweed sheet 20, a layer of rice, such as vinegared rice, is utilized, The rice layer 21 is deposited interiorly of the framework 11 up to a height defined by the lowermost end of each of the first and second "V" shaped notches 16 and 17. Subsequently a layer of seafood 22 or other suitable substitute is deposited onto the upper surface of the rice layer 21 up to the upper edges 14a and 15a of the side walls 14 and 15. Subsequently, as illustrated in FIG. 6, the framework 11 is removed and, as illustrated in FIG. 7, the bamboo mat 18 is rolled to initiate rolling of the sushi roll within the seaweed sheet 20, whereupon rolling is finished by an individual roller and placed upon a suitable tray. The gauge apparatus enables the use and predictability of bulk quantities of components utilized in the formation of a rolled sushi product.

FIG. 8 illustrates the framework 11 formed with a continuous downwardly tapering interior wall surface to define trapezoidal side and end walls 14, 15, 12, and 13. The tapering interior walls enhance retention and positioning of stacked layers of rice and seafood product 22 deposited upon the underlying seaweed sheet 20. Further, the continuous planar bottom surface 24 defined by the side walls and the end walls of the framework 11 include a series of spaced projections 25 terminating in pointed exterior end surfaces and in the form of conical members are integrally mounted to the bottom surface 24 at spaced intervals, as illustrated in FIG. 9 for example. The projections enhance engagement and clamping of the seaweed sheet 20 to the underlying bamboo mat 18 during the filling procedure of the framework as described above.

As to the manner of usage and operation of the instant invention, the same should be apparent from the above disclosure, and accordingly no further discussion relative to the manner of usage and operation of the instant invention shall be provided.

With respect to the above description then, it is to be realized that optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of gauging and forming sushi comprising the steps of:
   a. providing a bamboo mat defined by a predetermined upper surface and positioning the mat on a support surface, and
   b. placing a flexible seaweed sheet on said bamboo mat, said flexible seaweed sheet defined by a further surface less than that of the predetermined surface of the bamboo mat, and
   c. providing a frame member and positioning the frame member onto an upper surface of the seaweed sheet, and
   d. forming a layer of rice within the frame member, and
   e. forming a layer of seafood overlying the layer of rice to completely fill the frame member, and
   f. removing the frame member, and
   g. rolling the bamboo mat, the seaweed sheet, rice and seafood in unison to form a sushi roll.

2. A method as set forth in claim 1 wherein the step of providing a frame member includes forming the frame member as a rectangular framework, with tapering interior side walls and forming spaced "V" shaped notches through an upper surface of the frame member downwardly thereof, and wherein the step of filling the framework with a layer of rice includes filling the framework to a bottom portion of each "V" shaped notch.

* * * * *